(12) United States Patent
Jin et al.

(10) Patent No.: US 10,354,273 B2
(45) Date of Patent: Jul. 16, 2019

(54) SYSTEMS AND METHODS FOR TRACKING BRAND REPUTATION AND MARKET SHARE

(71) Applicant: Excalibur IP, LLC, New York, NY (US)

(72) Inventors: Jing Jin, Sunnyvale, CA (US); Pengyuan Wang, Sunnyvale, CA (US); Ayman Farahat, Santa Clara, CA (US)

(73) Assignee: Excalibur IP, LLC, New York, NY (US)

( * ) Notice: Subject to any disclaimer, the term of this patent is extended or adjusted under 35 U.S.C. 154(b) by 922 days.

(21) Appl. No.: 14/533,898

(22) Filed: Nov. 5, 2014

(65) Prior Publication Data

US 2016/0125450 A1    May 5, 2016

(51) Int. Cl.
*G06Q 30/02* (2012.01)

(52) U.S. Cl.
CPC ..... *G06Q 30/0242* (2013.01); *G06Q 30/0201* (2013.01)

(58) Field of Classification Search
CPC .................. G06Q 30/0201; G06Q 30/0242
See application file for complete search history.

(56) References Cited

U.S. PATENT DOCUMENTS

| 2011/0004483 | A1* | 1/2011 | Ting | G06Q 30/02 705/1.1 |
| 2012/0310728 | A1* | 12/2012 | Kagan | G06Q 30/02 705/14.43 |
| 2014/0149425 | A1* | 5/2014 | Kalmes | G06F 17/30029 707/748 |
| 2015/0032512 | A1* | 1/2015 | Bateni | G06Q 30/0206 705/7.35 |
| 2015/0149373 | A1* | 5/2015 | Chhaya | G06Q 50/01 705/319 |
| 2016/0132915 | A1* | 5/2016 | Puranik | G06Q 30/0206 705/7.35 |

OTHER PUBLICATIONS

Wikipedia, "Principal component analysis", Apr. 1, 2019, Abstract.*
J.H. Stock and M.W. Watson, "Dynamic Factor Models", Jan. 2010, Oxford Handbook of Economic Forecasting, pp. 2-3.*

* cited by examiner

*Primary Examiner* — Mario C. Iosif
(74) *Attorney, Agent, or Firm* — Brinks Gilson & Lione

(57) ABSTRACT

Systems and methods for tracking brand reputation and market share are provided. The system includes one or more devices having a processor and a non-transitory storage medium accessible to the hardware processor. The device is programmed to obtain an awareness index at a plurality of levels at least partially based on the brand data. The device is programmed to obtain a favorability index as a ratio of user numbers based on the brand data. The device is programmed to obtain a branding index by combining the awareness index and the favorability index. The device is programmed to obtain an affinity score for a group of users at least partially based on the brand data and recommend the group of users based on the affinity score to increase the branding index.

10 Claims, 6 Drawing Sheets

SYSTEMS AND METHODS FOR TRACKING BRAND REPUTATION AND MARKET SHARE

BACKGROUND

The Internet is a ubiquitous medium of communication in most parts of the world. The emergence of the Internet has opened a new forum for the creation and placement of advertisements (ads) promoting products, services, and brands. Internet content providers rely on advertising revenue to drive the production of free or low cost content. Advertisers, in turn, increasingly view Internet content portals and online publications as a critically important medium for the placement of advertisements.

While the performance of an individual online advertising campaign may be measured by the number of conversions, it is very difficult to measure the performance of a branding campaign in the whole Internet space because there is no proper success metric available. The existing indexes are generally based on a single signal and only present the data itself. Therefore, the existing indexes are not helpful for advertisers to make branding decisions. In short, the existing technology does not provide a solution to the advertisers on how to directly measure the overall reputation and market share of one brand.

Thus, there is a need to develop methods and systems to help measure the overall brand awareness and favorability in the market.

SUMMARY

Different from conventional solutions, the disclosed system solves the above problem by building a computer system using data driven models to provide one representative branding index.

In a first aspect, the embodiments disclose a computer system that includes one or more devices having a processor and a non-transitory storage medium accessible to the hardware processor. The system includes a memory storing a database including brand data. The system also includes a server computer in communication with the database. The server computer is programmed to obtain an awareness index at a plurality of levels at least partially based on the brand data. The server computer is programmed to obtain a favorability index as a ratio of user numbers based on the brand data. The server computer is programmed to obtain a branding index by combining the awareness index and the favorability index. The server computer is programmed to obtain an affinity score for a group of users at least partially based on the brand data and recommend the group of users based on the affinity score to increase the branding index.

In a second aspect, the embodiments disclose a computer implemented method by a system that includes one or more devices having a processor. In the computer implemented method, the system obtains an awareness index vector related to a brand over a period of time. The system obtains a favorability index vector based on historical user behavior regarding the brand over the period of time. The system estimates a weight vector based on the awareness index vector and the favorability index vector using a principal component analysis. The system obtains a branding index as a linear combination of the awareness index vector and the favorability index vector with the weight vector.

In a third aspect, the embodiments disclose a non-transitory storage medium configured to store a set of modules. The non-transitory storage medium includes a module for obtaining an awareness index related to a brand over a period of time based on brand data from a plurality of sources including: search data, social data, content data, and email data. The non-transitory storage medium further includes a module for obtaining a favorability index as a ratio of user numbers based on historical user behavior regarding the brand over the period of time. The non-transitory storage medium further includes a module for estimating a weight based on the awareness index and the favorability index using a principal component analysis. The non-transitory storage medium further includes a module for obtaining a branding index as a linear combination of the awareness index and the favorability index with the weight. The non-transitory storage medium further includes a module for obtaining an affinity score for a group of users based on a ratio of search volumes from the brand data.

DETAILED DESCRIPTION OF THE DRAWINGS

Figure 1:
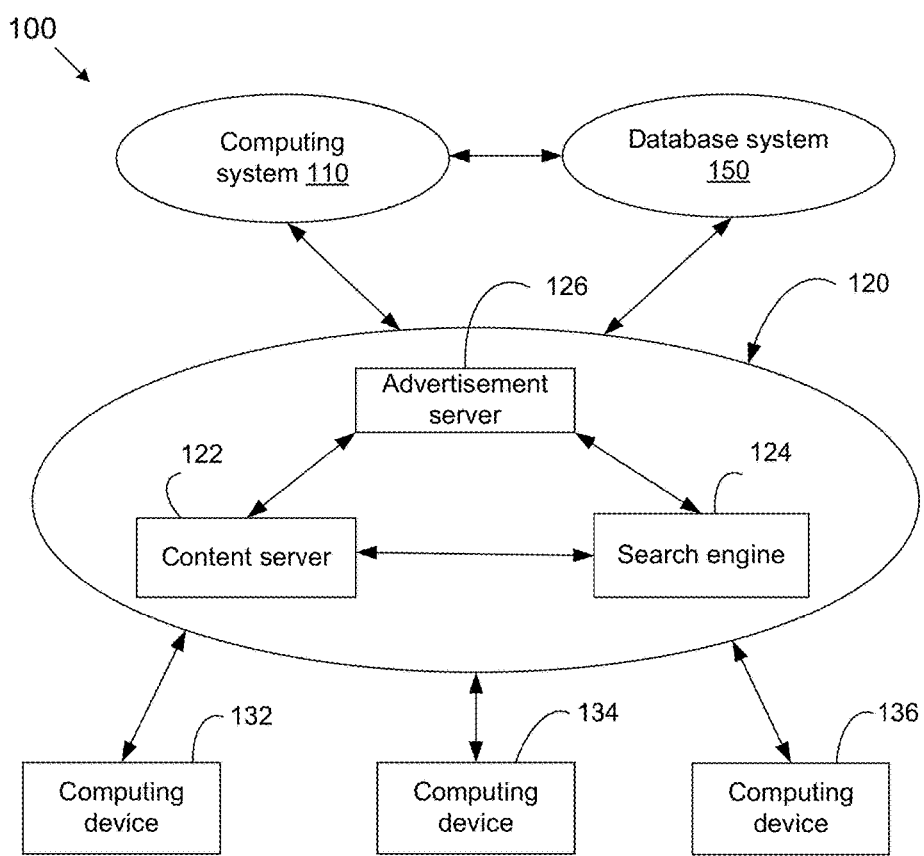
FIG. 1 is a block diagram of an example environment in which a computer system according to one embodiment of the disclosure may operate.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

While the performance of a direct response campaign may be measured by the number of clicks, the number of searches, or the number of conversions, it is very difficult to measure the performance of a branding campaign since there is no proper success metric available. For large publishers like Yahoo!, advertisers may run many branding campaigns within the same publisher. Thus, it is desirable for advertisers to know the performance of such branding campaigns. Further, it would be desirable to create an industry standard index so that advertisers can refer to their branding measurement among different publishers. The present disclosure provides a computer system that directly tracks the performance of a product brand, a product category, or an online network.

FIG. 1 is a block diagram of one embodiment of an environment 100 in which a system for tracking brand performance may be implemented. However, it should be appreciated that the systems and methods described below are not limited to use with the particular exemplary environment 100 shown in FIG. 1 but may be extended to a wide variety of implementations.

The environment 100 may include a computing system 110 and a connected server system 120 including a content server 122, a search engine 124, and an advertisement server 126. The computing system 110 may include a cloud computing environment or other computer servers. The server system 120 may include additional servers for additional computing or service purposes. For example, the server system 120 may include servers for social networks, online shopping sites, and any other online services.

The content server 122 may be a computer, a server, or any other computing device known in the art, or the content server 122 may be a computer program, instructions, and/or software code stored on a computer-readable storage medium that runs on a processor of a single server, a plurality of servers, or any other type of computing device known in the art. The content server 122 delivers content, such as a web page, using the Hypertext Transfer Protocol and/or other protocols. The content server 122 may also be a virtual machine running a program that delivers content.

The search engine 124 may be a computer system, one or more servers, or any other computing device known in the art, or the search engine 124 may be a computer program, instructions, and/or software code stored on a computer-readable storage medium that runs on a processor of a single server, a plurality of servers, or any other type of computing device known in the art. The search engine 124 is designed to help users find information located on the Internet or an intranet.

The advertisement server 126 may be a computer system, one or more computer servers, or any other computing device known in the art, or the advertisement server 126 may be a computer program, instructions and/or software code stored on a computer-readable storage medium that runs on a processor of a single server, a plurality of servers, or any other type of computing device known in the art. The advertisement server 126 is designed to provide digital ads to a web user based on display conditions requested by the advertiser. The advertisement server 126 may include computer servers for providing ads to different platforms and websites.

The computing system 110 and the connected server system 120 have access to a database system 150. The database system 150 may include memory such as disk memory or semiconductor memory to implement one or more databases. At least one of the databases in the database system may be a user database that stores information related to a plurality of users. The user database may be organized on a user-by-user basis such that each user has a unique record file. The record file may include all information related to a specific user from all data sources. For example, the record file may include personal information of the user, search histories of the user from the search engine 124, web browsing histories of the user from the content server 122, or any other information the user agreed to share with a service provider that is affiliated with the computer server system 120.

The environment 100 may further include a plurality of computing devices 132, 134, and 136. The computing devices may be a computer, a smart phone, a personal digital aid, a digital reader, a Global Positioning System (GPS) receiver, or any other device that may be used to access the Internet.

The disclosed system and method for tracking brand performance may be implemented by the computing system 110. Alternatively or additionally, the system and method for tracking brand performance may be implemented by one or more of the servers in the server system 120. The disclosed system may instruct the computing devices 132, 134, and 136 to display all or part of the user interfaces to request input from the advertisers. The disclosed system may also instruct the computing devices 132, 134, and 136 to display all or part of the brand performance to the advertisers.

Generally, an advertiser or any other user may use a computing device such as computing devices 132, 134, and 136 to access information on the server system 120. The advertiser may want to identify a target audience for the advertiser's product or services. Based on the target audience and the products, the advertiser may start one or more branding campaigns on different online platforms. The advertiser may want to know the performance of the branding campaigns afterwards. Specifically, the advertisers may want to know whether the branding campaigns improved its overall reputation or market share, etc. The disclosed system provides a single branding index that helps the advertisers to directly measure the campaign performances. Further, the system reveals the underlying user preferences using a favorability index. Finally, the system helps the advertiser to identify target audiences by creating an audience affinity score that is user preference to one brand at audience level.

Accordingly, the system solves technical problems presented by managing large amounts of data represented by transactions performed by the system during processing of the branding campaigns. Through processing collected data, the system develops a single branding index which is representative of the processed branding campaign data. Similarly, by processing the collected data the system develops favorability index and the audience affinity score which are representative of additional aspects of the processed data. Use of the single branding index, the favorability index, and the audience affinity score provides a rapid and clear understanding of the underlying data and improves efficiency for machines and users that have to interpret this data. The single branding index may be tracked and understood by the advertisers or machines accessible to the advertisers.

Figure 2:
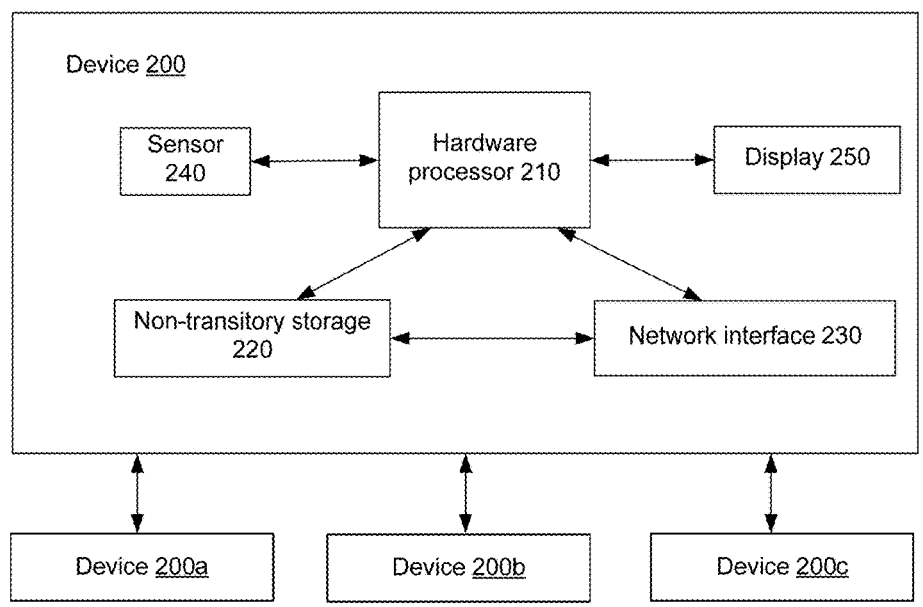
FIG. 2 illustrates an example computing device in the computer system for interacting with the advertiser.

FIG. 2 illustrates an example computing device 200 for interacting with the advertiser. The computing device 200 may be a computer, a smartphone, a server, a terminal device, or any other computing device including a hardware processor 210, a non-transitory storage medium 220, and a network interface 230. The hardware processor 210 accesses the programs and data stored in the non-transitory storage medium 220. The device 200 may further include at least one sensor 240, circuits, and other electronic components. The device may communicate with other devices 200a, 200b, and 200c via the network interface 230.

The computing device 200 may display user interfaces on a display unit 250. For example, the computing device 200 may display a user interface on the display unit 250 asking the advertiser to select one or more competitor brands to monitor their respective brand performances over a period of time. The computing device 200 may further display the brand performance using figures or drawings which may be easily understood by the advertiser. The drawings and figures may have different formats such as bar charts, pie charts, trend lines, area charts, etc.

Figure 3:
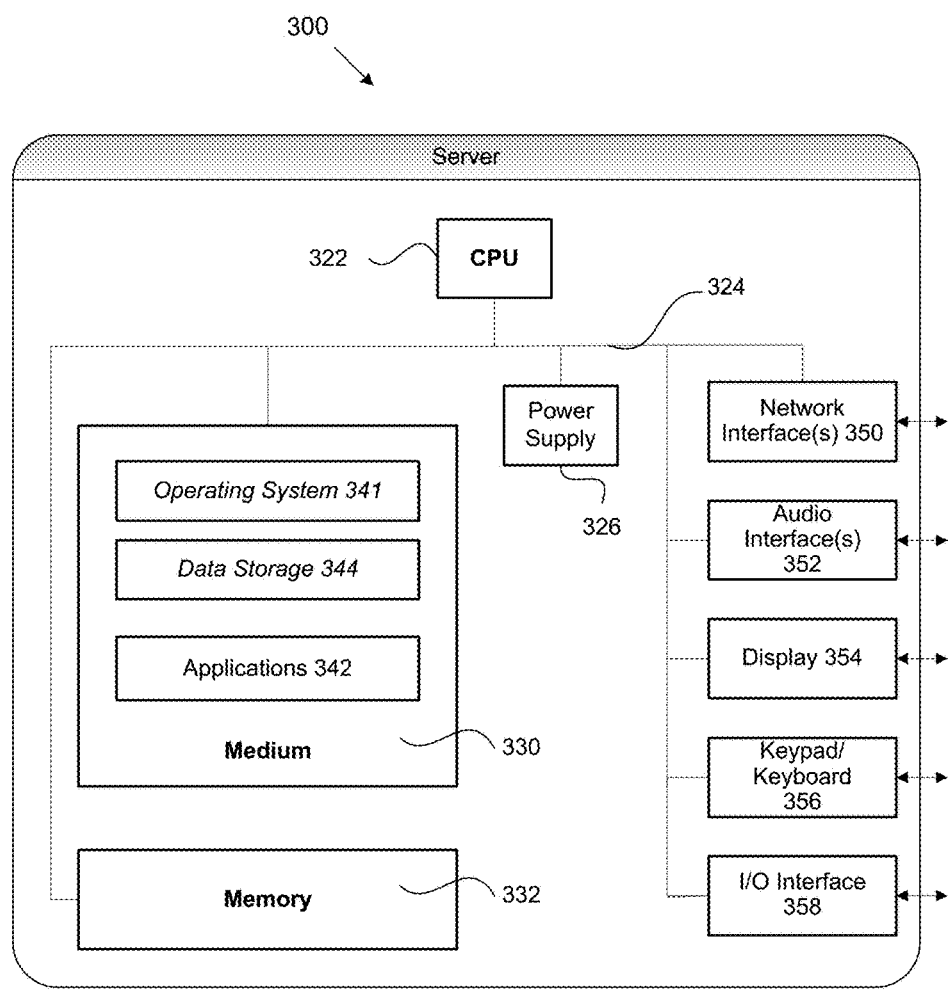
FIG. 3 illustrates an example embodiment of a server computer for tracking brand performance.

FIG. 3 is a schematic diagram illustrating an example embodiment of a server. A server 300 may include different hardware configurations or capabilities. For example, a server 300 may include one or more central processing units 322, memory 332 that is accessible to the one or more central processing units 322, one or more medium 630 (such as one or more mass storage devices) that store application programs 342 or data 344, one or more power supplies 326, one or more wired or wireless network interfaces 350, one or more input/output interfaces 358. The memory 332 may include non-transitory storage memory and transitory storage memory.

A server 300 may also include one or more operating systems 341, such as Windows Server, Mac OS X, Unix, Linux, FreeBSD, or the like. Thus, a server 300 may include, as examples, dedicated rack-mounted servers, desktop computers, laptop computers, set top boxes, integrated devices combining various features, such as two or more features of the foregoing devices, or the like.

The server 300 in FIG. 3 may serve as any computer server shown in FIG. 1. The server 300 may also serve as a computer server that implements the computer system for tracking brand performance. In either case, the server 300 is in communication with a database that stores brand data from a plurality of sources including search data, content data, email data, and social data.

For example, the brand data may include at least the following data related to the underlying brand or product: the number of search queries, the number of article reviews, the number of commercial emails, and the number of shares in one or more social networks. These aspects well represent brand reputation and market share in search, content, email and social areas. For each aspect, the server 300 calculates two signals: an awareness index and a favorability index. The awareness index represents how many people know about one brand while the favorability index represents how much people prefer one brand to its competitors. The server 300 may calculate the two indexes over different geographical regions to help the advertisers to determine which geographical region has more potential to grow and which region may generate more conversions.

Specifically, the server 300 may be programmed to obtain an awareness index at a plurality of levels at least partially based on the brand data. The server 300 may be programmed to obtain a favorability index as a ratio of user numbers based on the brand data. The server 300 may be programmed to obtain a branding index by combining the awareness index and the favorability index. The server 300 may be programmed to obtain an affinity score for a group of users at least partially based on the brand data. The server 300 may be programmed to recommend the group of users based on the affinity score to increase the branding index. Other techniques for determining these values may be substituted as well.

There are a number of factors that may impact the search volume from different data sources. Some of these factors may be related to the brand, for example, whether the brand gained market share. Other factors may need to be modeled by additional factors. For example, the additional factors may include a long term trending factor and a short term seasonal factor. The computer server may adjust for yearly trending and seasonal variation and to separate these variations with underlying brand performance. Thus, the server 300 is programmed to adjust raw brand data by an adjustment factor that is a combination of a seasonal factor and a trending factor.

The server 300 is programmed to obtain a baseline category index by adjusting the awareness index at the category level by a corresponding adjustment factor. The server 300 then calculates the awareness index by dividing the awareness index at the company level or the brand level by the baseline category index.

After obtaining the awareness index and the favorability index, the server 300 is programmed to combine the awareness index and the favorability index by a dynamic factor model (DFM) or a principal component analysis, where the dynamic factor model takes a dynamic effect over time into account and models the branding index at time t+1 to depend on the branding index at time t. The server 300 may use both DFM and principal component analysis. The server 300 may also use other similar models to combine the awareness index and the favorability index. The server 300 is programmed to obtain the branding index by using the principal component analysis that models the branding index that controls an observed signal and estimates the branding index by a mean of principal components.

Figure 4:
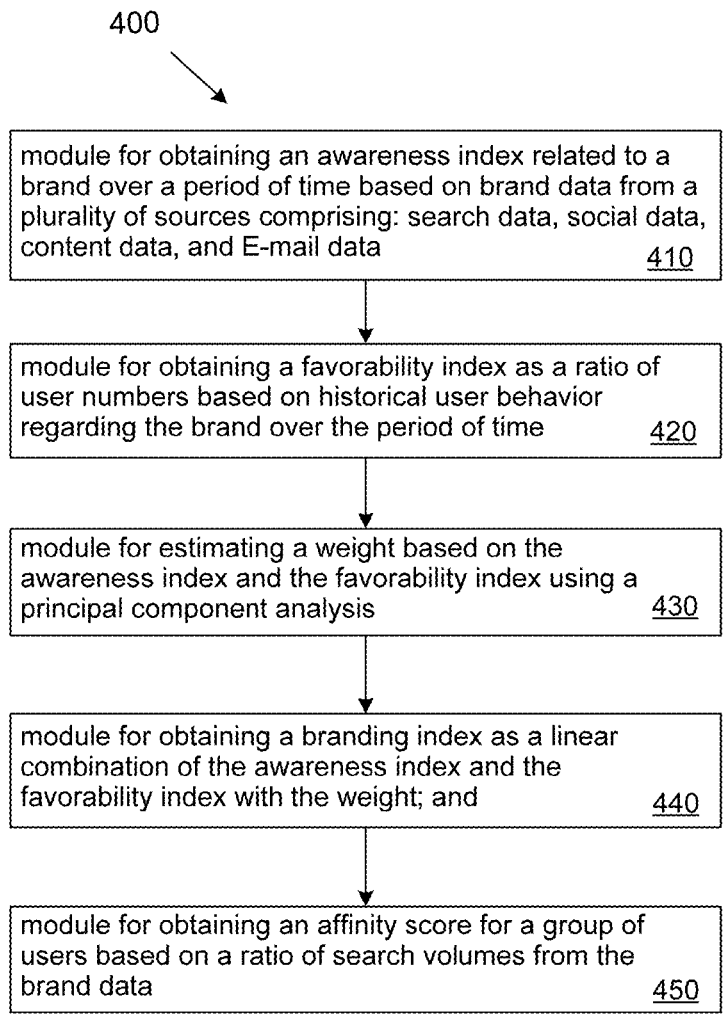
FIG. 4 is an example block diagram illustrating embodiments of the non-transitory storage of the server computer.

FIG. 4 illustrates embodiments of a non-transitory storage medium 400 in the server 300 illustrated in FIG. 3. The non-transitory storage medium 400 includes one or more modules. The one or more modules may be implemented as program code and data stored on the non-transitory storage medium, for example. The non-transitory storage medium 400 may include alternative, additional or fewer modules in other embodiments. The non-transitory storage medium 400 includes a module for recording brand data in a database.

The non-transitory storage medium 400 includes a module 410 for obtaining an awareness index related to a brand over a period of time based on brand data from a plurality of sources comprising: search data, social data, content data, and email data.

The non-transitory storage medium 400 includes a module 420 for obtaining a favorability index as a ratio of user numbers based on historical user behavior regarding the brand over the period of time. The non-transitory storage medium 400 may include a module for obtaining a favorability index as a ratio of a first user number and a second user number. The first user number represents a total number of users who performed at least two actions related to the brand during a preset time period. The second user number represents a total number of users who performed at least one action related to the brand.

The non-transitory storage medium 400 includes a module 430 for estimating a weight based on the awareness index and the favorability index using a principal component analysis (PCA). PCA is a statistical procedure that uses an orthogonal transformation to convert a set of observations of possibly correlated variables into a set of values of linearly uncorrelated variables called principal components. The number of principal components is less than or equal to the number of original variables. This transformation is defined in such a way that the first principal component has the largest possible variance, which accounts for as much of the variability in the data as possible. Each succeeding component in turn has the highest variance possible under the constraint that it is orthogonal to (i.e., uncorrelated with) the preceding components. The principal components are orthogonal because they are the eigenvectors of the covariance matrix, which is symmetric. Generally, PCA may be sensitive to the relative scaling of the original variables. Here, the server may use the PCA to model the branding index as a latent factor that controls the signals in the branding data. The signals may include the number of search queries, the number of article reviews, the number of commercial emails, and the number of shares in social network, or any other observed signals related to the brand data recorded in the database.

The non-transitory storage medium 400 includes a module 430 for obtaining a branding index as a linear combination of the awareness index and the favorability index with the weight.

The non-transitory storage medium 400 may further include a module 450 for obtaining an affinity score for a group of users based on a ratio of search volumes from the brand data. For instance, if the brand data are from Yahoo!, the audience affinity score provides insight on the brand preference of the users belong to one audience compared to a random audience on Yahoo!.

The non-transitory storage medium 400 may further include module for estimating a seasonal factor and a trending factor based on total search volume over a preset period of time and module for adjusting raw brand data by an adjustment factor that is a combination of the seasonal factor and the trending factor.

The non-transitory storage medium 400 may include modules for displaying the audience affinity score, the awareness index, the favorability index, and the final branding index. The modules for displaying may further include sub-modules to adjust the display effects on different hardware devices.

Figure 5A:
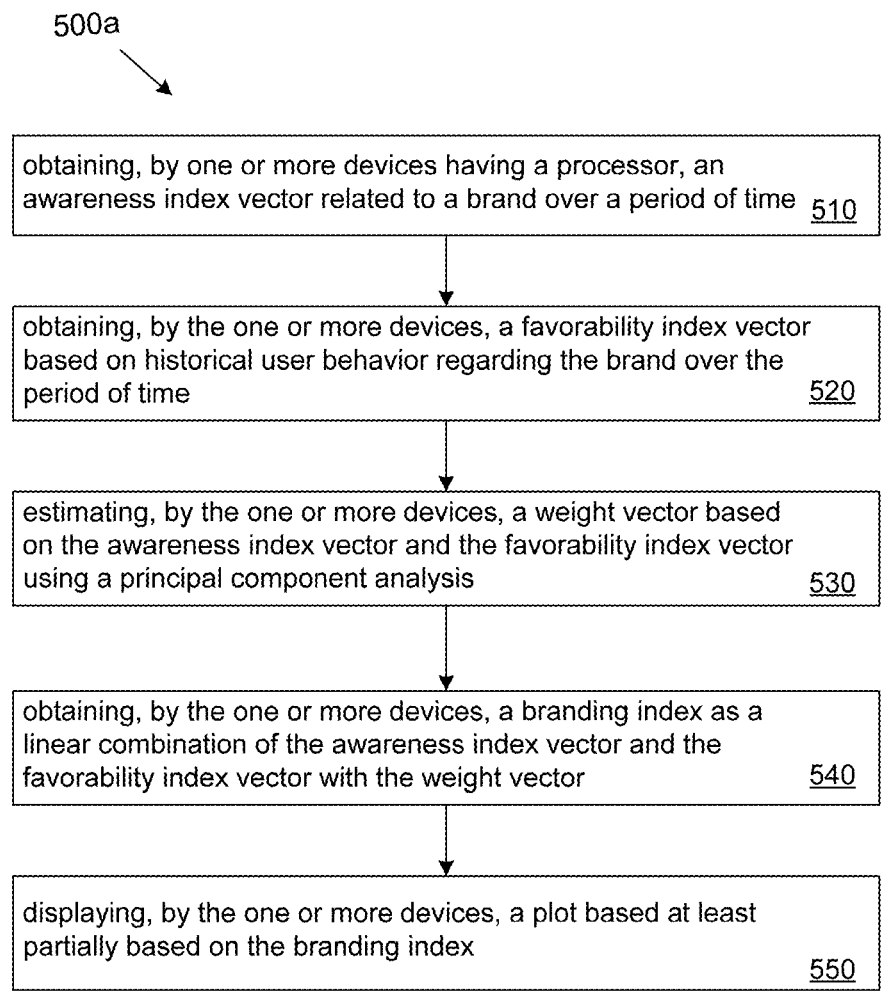
FIG. 5A is an example block diagram illustrating embodiments of the disclosure.

FIG. 5A is an example block diagram 500a illustrating embodiments of the disclosure. The block diagram 500a may be implemented at least partially by a computer system that includes a computer server 300 having a processor or computer and illustrated in FIG. 3. The computer implemented method according to the example block diagram 500a includes the following acts. Other acts may be added or substituted.

In act 510, the computer system obtains data defining an awareness index vector related to a brand over a period of time. The awareness index vector may include a plurality of awareness indexes based on different data sources. For example, the awareness index vector may include four awareness indexes respectively based on search data, social data, content data, and email data. This may represent a large amount of raw data from different sources. Further, some of the data from different sources may be difficult to compare or process together, especially in a way that provides a user friendly or meaningful result.

Taking search data as an example, the search awareness index may be calculated at three levels: category level, company level, and brand level. For instance, "auto" is one category; "Ford" is one company; "Edge/Escape/Focus" are brands of company Ford. The category search volume in a period of time may need to be adjusted by its corresponding adjustment factor, and hence be used as baseline for index calculation at all levels. For a given company/brand, the search awareness index at time period t is calculated by:

$$\text{Search Index}_t = \text{Search Volume}_t * C/\text{baseline} \qquad (1)$$

The time period t may be a month, a week, etc. When there are search volume data for the different levels recorded over a plurality of time periods, the computer server may draw a plot of the search awareness index over the plurality of time periods. Similarly, the awareness indexes may be calculated based on social data, content data, and email data.

In act 520, the computer system obtains a favorability index vector based on historical user behavior regarding the brand over the period of time. The favorability index may represent at least partially the real preference of users in different brands within the same category during the period of time. One way to get this is to count how many users search on one particular brand after searching on generic keywords. Another way is to count how many users click on brand related web address after searched on generic keywords (i.e., cars, auto).

In act 530, the computer system estimates a weight vector based on the awareness index vector and the favorability index vector using a principal component analysis. Suppose that N signals are available in the past T time periods, represented by Y[t], t=1, 2, ..., T, where Y[t] is a vector of length N containing the N brand signals observed at time T. For example, Y[t] may include the awareness index vector and the favorability index vector at a particular time.

The computer system estimates a single indicator f[t] that represents the general trend in Y[t]. The computer system may adopt PCA to model the indicator f[t] as a latent factor that controls the signal Y[t], with the following equation:

$$Y[t] = Cf[t] + e[t], \qquad (2)$$

where C is a constant vector of length N, and e[t] is the noise vector. The above model may be used to compute the branding index from a plurality of signals. The branding index f[t] may be estimated by mean of principal components.

The covariance matrix of Y[t] is calculated as:

$$Sigma_Y = \frac{1}{T}\sum ((Y[t]-mu)(Y[t]-mu)'), \qquad (3)$$

where the summation is from t=1 to t=T and mu is an average of Y[t]. This is followed by calculation of first eigenvector u of Sigma_Y. Here, the computer system may use the eigenvector u of Sigma_Y as the weight vector.

In act 540, the computer system obtains a branding index as a linear combination of the awareness index vector and the favorability index vector with the weight vector. For example, the eigenvector u is used to calculate f[t] using the following equation, $$f[t]=u'Y[t], \qquad (4)$$

Thus, the branding index f[t] is a linear combination of all signals Y[t] and the combination weights is represented by the vector u. After obtaining the branding index f[t] via PCA, the computer system may further fits an autoregressive integrated moving average (ARIMA) model to smooth the branding index f[t]. The residuals after the time series fit are white noises with no auto-correlation.

In act 550, the computer system displays a plot based at least partially on the branding index. For example, the computer system may display a plot based on the change of the branding index over a selected period of time. The computer system may also display multiple plots to compare one brand with its competitors. The computer system may display pie charts based on a plurality of brands in a product category. Thus, the substantial amount of data collected by the system has been processed to provide an easy to review indicator of the transactions represented by the data.

The above acts may be repeated to get more conversions. For example, the acts may be repeated for each day or each week to update the allocation of the budget during each day or each week.

Figure 5B:
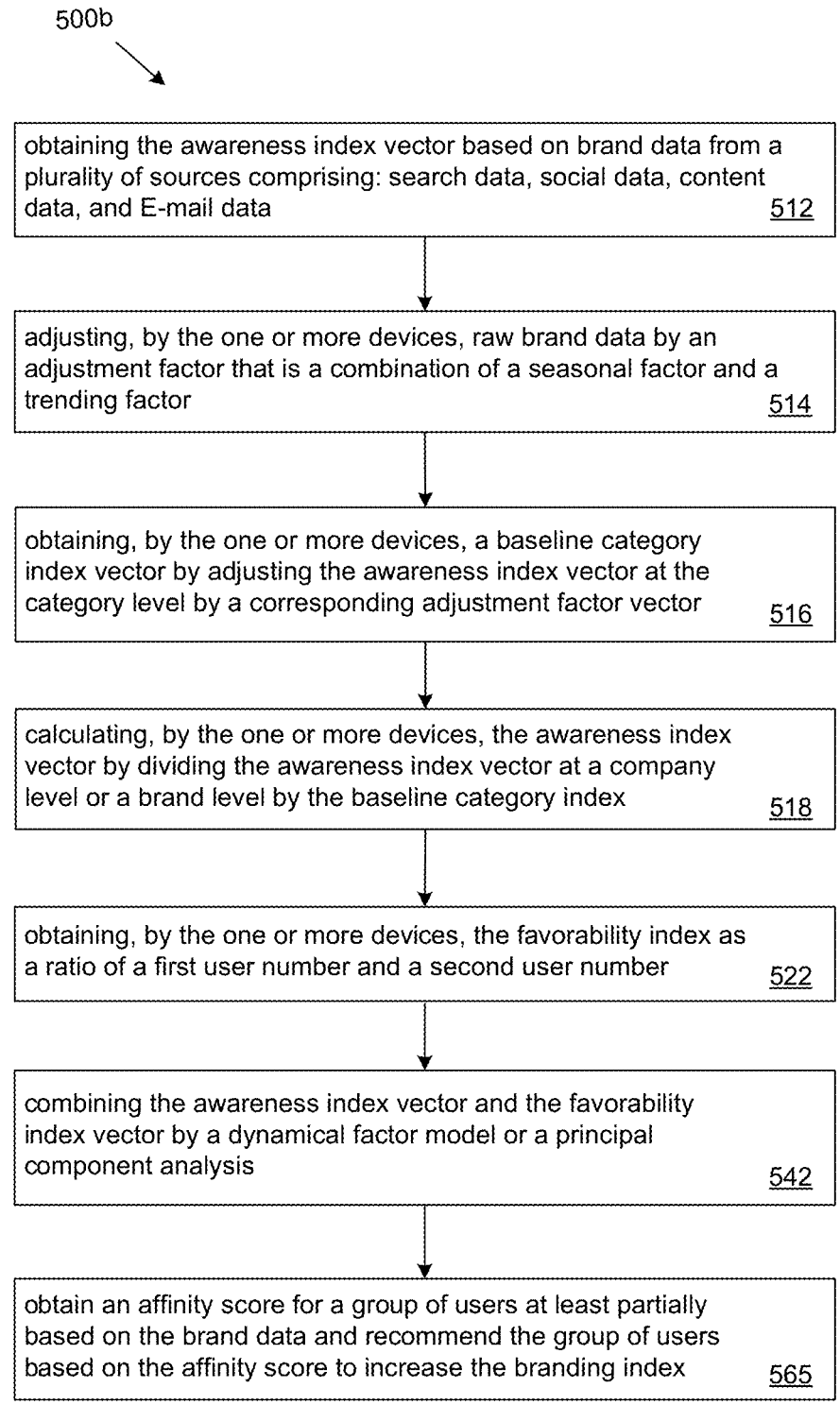
FIG. 5B is an example block diagram illustrating embodiments of the disclosure.

FIG. 5B is an example block diagram 500b illustrating embodiments of the disclosure. The acts in the example block diagram 500b may be combined with the acts in the block diagram 500a shown in FIG. 5A. Similarly, the acts in block diagram 500b may be implemented at least partially by a computer system that includes a server computer 300 disclosed in FIG. 3. The computer implemented method according to the example block diagram 500b includes the following acts. Other acts may be added or substituted.

In act 512, the computer system obtains the awareness index vector based on brand data from a plurality of sources comprising: search data, social data, content data, and email data. This act may be included in act 510 in FIG. 5A.

In act 514, the computer system adjusts raw brand data by an adjustment factor that is a combination of a seasonal factor and a trending factor. This act may be included in act 510 in FIG. 5A. For example, the daily variation of the total search volume on a particular search engine may be affected by at least two important aspects. First, the daily search volume may be affected by a market share change of the search engine. Second, the daily search volume may have seasonal components. Similarly, the social data, content data, and email data may be affected by a long-term trend factor and a short-term seasonal factor.

To estimate the two factors, the computer system may adopt the following model. Using search data as an example, the daily search volume may be modeled $$search_t=\alpha*trend_t*seasonal_t \qquad (5)$$

$$\log(search_t)=\log(\alpha)+g(t)+\log(seasonal_t) \qquad (6)$$

Where α is a constant, g(t) is the long-term trending function. Equation 5 and equation 6 describe the search volume at time "t" as a function of long-term trend g(t) and the seasonal variation $seasonal_t$. The computer system may model the seasonal variation $seasonal_t$ as a categorical variable. The computer system may use a quadratic term to model the long-term trend g(t). Therefore, the adjustment factor is a combination of seasonal factor and the trending factor. The computer system may obtain the seasonal factor and the trending factor using historical data over a relatively long period of time. For example, the computer system may obtain the seasonal factor and the trending factor using data over a few years. The raw search volume is then adjusted by its corresponding adjustment factor to remove the effects of the seasonal factor and the trending factor.

In act 516, the computer system obtains a baseline category index vector by adjusting the awareness index vector at the category level by a corresponding adjustment factor. The category search volume in a period of time may need to be adjusted by its corresponding adjustment factor obtained in act 514. The category search volume in the first time period is adjusted by its corresponding adjustment factor, and hence may be used as baseline for awareness index calculation at all levels. The advertisers may select the first time period as the month before the branding campaign is started or any time period of interest. This act may be included in act 510 in FIG. 5A.

In act 518, the computer system calculates the awareness index vector by dividing the awareness index vector at a company level or a brand level by the baseline category index. The computer system obtains the awareness index vector at three levels: category level, company level, and brand level. After obtaining the baseline category index in act 516, the computer system may calculate the company/brand level search awareness index at month t based on equation 1. This act may be included in act 510 in FIG. 5A.

In act 522, the computer system obtains a favorability index as a ratio of a first user number and a second user number. The first user number represents a total number of the first group of users who performed at least two actions related to the brand during a preset time period. The second user number represents a total number of the second group of users who performed at least one action related to the brand. The first group of users may be a subset of the second group of users. For example, in search data, the actions may include at least one of: searching using keywords directly related to the brand, searching using keywords related to a generic category that includes the brand. In this case, the first user number represents the total number of users who performed search on one particular brand after searching on generic keywords. The second user number represents the total number of users who performed searches on the generic keywords.

In content data, the actions may include at least one of: viewing content related to the specific brand, viewing content related to a generic category that includes the brand. In social data, the actions may include at least one of: interacting with messages related to the specific brand, interacting with messages related to a generic category that includes the brand. The interacting may include sharing, liking, posting, following, and replying, etc. In email data, the actions may include at least one of: reading messages related to the specific brand, reading messages related to a generic category that includes the brand, clicking on a HTTP link in messages that includes the specific brand. The computer system may select a preset time period as an upper threshold of allowed delay between any of these two actions. In other words, the at least two actions related to the brand should be performed during the preset time period to be counted as one of the first group of users.

In act 542, the computer system combines the awareness index vector and the favorability index vector by a dynamic factor model or a principal component analysis. The dynamic factor model takes a dynamic effect over time into account and models the branding index at time t+1 to depend on the branding index at time t. This act may be included in the act 540 in FIG. 5A. Here, the dynamic factor model utilizes multiple observed time series signals to create a representative unobserved co-movement signal. For example, the observed signals are the number of page views, the number of search queries and other user behaviors which correspond to search data, content data, email data and social data. The unobserved signal is the branding index that derived from the four types of data mentioned above. Each type of data includes two individual signals: awareness and favorability. The DFM model takes the dynamic effect over time into account that the branding index at time t+1 depends on the branding index in the previous period, t. Therefore, the model reduces noise which makes the combined branding signal much smoother. The model may be described as the following equations:

$$f_t = af_{t-1} + e_t \tag{7}$$

$$Y_t = Cf_t + Bx_t + v_t \tag{8}$$

Equation 7 is a dynamic smooth term that the signal at time t depends on the signal in the previous time period t−1, where $e_t$ represents noise. Equation 8 models observed signal $Y_t$ by the unobserved signal $f_t$, other factors $x_t$, and a random shock term v.

In act 565, the computer system obtains an affinity score for a group of users at least partially based on the brand data and recommends the group of users based on the affinity score to increase the branding index. The affinity score is calculated at the audience level and it is partially related to audience information. For each company and brand, the audience affinity score provides insight on the preference of the users belong to one audience compared to the general audience. For company j, to get affinity score for audience i, we get the following data:

|  | Company j | Other company within the same category |
|---|---|---|
| Audience i | $A_{ij}$ | $B_{ij}$ |
| General Audience | $C_{ij}$ | $D_{ij}$ |

$A_{ij}$ represents the search volume of audience i on company j. $B_{ij}$ represents the search volume of audience i on all companies in the category except for company j. $C_{ij}$ represents the search volume of all audiences in the analysis except audience i on company j. $D_{ij}$ represents the search volume of all audiences in the analysis except audience i on all companies in the category except company j.

The affinity score for audience i on company j may be calculated by:

$$\frac{A_{i,j}/(A_{i,j} + B_{i,j})}{C_{i,j}/(C_{i,j} + D_{i,j})} \tag{9}$$

The computer system may multiply a constant to the above affinity score for simple interpretation. The affinity score measures how much more searches that audience i users did on company j than general users did on company j during a period of time. Therefore, the affinity score gives advertisers relative audience performance. Hence, the affinity score may be used as reference when making targeting decision. A high affinity score may indicate that the audience is statistical significantly more likely to search on one company than general users. A low affinity score may indicate that the audience is statistical significantly less likely to search on one company. The computer system may determine thresholds based on history data to determine whether the affinity score is high or low.

The disclosed computer implemented method may be stored in computer-readable storage medium. The computer-readable storage medium is accessible to at least one hardware processor. The processor is configured to implement the stored instructions to select a target audience based on extracted features from the user data and the advertiser input.

From the foregoing, it can be seen that the present embodiments provide a computer system that provides a branding index for measure the brand reputation and market share for a specific brand in the online space. With the branding index, advertisers may measure the performance of branding campaigns directly. Further, the computer system provides an affinity score to advertisers to increase the branding index.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising a processor and a non-transitory storage medium accessible to the processor, the system comprising:
    a memory storing a database comprising brand data;
    a server computer in communication with the database, the server computer programmed to:
        obtain an awareness index vector, based on the brand data, for at least three levels including a category level, a company level, and a brand level, wherein the awareness index vector includes a plurality of awareness indexes corresponding to different data sources;
        adjust the awareness index vector at the category level by a corresponding adjustment factor, the adjustment factor representing a combination of a seasonal factor and a trending factor;
        obtain a baseline category index based on the adjustment to the awareness index vector;
        calculate the awareness index vector by dividing the awareness index at the company level or the brand level by the baseline category index;
        obtain a favorability index vector as a ratio of user numbers based on the brand data;
        obtain a branding index by combining the awareness index vector and the favorability index vector according to a principal component analysis comprising modeling the branding index as a latent factor controlling a vector of previous signals related to the brand over a period of time;
obtain an affinity score for a group of users at least partially based on the brand data; and
recommend the group of users based on the affinity score to increase the branding index.

2. The system of claim 1, wherein the database comprises brand data from a plurality of sources comprising at least: search data, social data, content data, and email data.

3. The system of claim 1, wherein the server computer is programmed to obtain the branding index vector by using the principal component analysis that models the branding index vector that controls an observed signal and estimates the branding index vector by a mean of principal components.

4. A method, comprising:
obtaining, by one or more devices having a processor, an awareness index vector, related to a brand over a period of time, for at least three levels including a category level, a company level, and a brand level, wherein the awareness index vector includes a plurality of awareness indexes corresponding to different data sources;
adjusting, by the one or more devices, the awareness index vector at the category level by a corresponding adjustment factor, the adjustment factor representing a combination of a seasonal factor and a trending factor;
obtaining, by the one or more devices, a baseline category index based on the adjustment to the awareness index vector;
calculating, by the one or more devices, the awareness index vector by dividing the awareness index vector at a company level or a brand level by the baseline category index;
obtaining, by the one or more devices, a favorability index vector based on historical user behavior regarding the brand over the period of time;
estimating, by the one or more devices, a weight vector based on the awareness index vector and the favorability index vector using a principal component analysis comprising modeling a branding index f[t] as a latent factor controlling a vector of previous signals related to the brand over a period of time Y[t], and calculating a covariance matrix Sigma_Y[t] of Y[t], wherein an eigenvector of Sigma_Y[t] is the weight vector; and
obtaining, by the one or more devices, the branding index f[t] as a linear combination of the awareness index vector and the favorability index vector with the weight vector according to the principal component analysis.

5. The method of claim 4, wherein the different data sources includes at least search data, social data, content data, and email data.

6. The method of claim 4, wherein obtaining the favorability index vector based on historical user behavior comprising:
obtaining, by the one or more devices, the favorability index as a ratio of a first user number and a second user number, wherein the first user number represents a total number of users who performed at least two actions related to the brand during a preset time period, and wherein the second user number represents a total number of users who performed at least one action related to the brand.

7. The method of claim 4, further comprising: displaying, by the one or more devices, a plot based at least partially on the branding index.

8. A non-transitory storage medium configured to store processor executable instructions, that when processed by a processor, cause the processor to:
obtain an awareness index vector related to a brand over a period of time based on brand data for at least three levels including a category level, a company level, and a brand level, wherein the awareness index vector includes a plurality of awareness indexes based on different data sources comprising at least: search data, social data, content data, and email data;
adjust the awareness index vector at the category level by a corresponding adjustment factor, the adjustment factor representing a combination of a seasonal factor and a trending factor;
obtain a baseline category index based on the adjustment to the awareness index vector;
calculate the awareness index vector by dividing the awareness index at the company level or the brand level by the baseline category index;
obtain a favorability index vector as a ratio of user numbers based on historical user behavior regarding the brand over the period of time;
estimate a weight based on the awareness index vector and the favorability index vector using a principal component analysis comprising modeling a branding index f[t] as a latent factor controlling a vector of previous signals related to the brand over a period of time Y[t], and calculating a covariance matrix Sigma_Y[t] of Y[t], wherein an eigenvector of Sigma_Y[t] is the weight vector;
obtain the branding index f[t] as a linear combination of the awareness index vector and the favorability index vector with the weight according to a principal component analysis; and
obtain an affinity score for a group of users based on a ratio of search volumes from the brand data.

9. The non-transitory storage medium of claim 8, wherein the processor executable instructions, when processed by a processor, further cause the processor to:
estimate the seasonal factor and the trending factor based on total search volume over a preset period of time.

10. The non-transitory storage medium of claim 8, wherein the processor executable instructions, when processed by a processor, cause the processor to:
obtain the favorability index vector as a ratio of a first user number and a second user number, wherein the first user number represents a total number of users who performed at least two actions related to the brand during a preset time period, and wherein the second user number represents a total number of users who performed at least one action related to the brand.

* * * * *